United States Patent [19]

Stockham, Jr. et al.

[11] 4,446,494
[45] May 1, 1984

[54] UNIFORM SPEED CONTROL FOR A MULTI-CHANNEL DIGITAL RECORDER

[75] Inventors: Thomas G. Stockham, Jr.; Bruce C. Rothaar, both of Salt Lake City, Utah

[73] Assignee: Soundstream, Inc., Salt Lake City, Utah

[21] Appl. No.: 299,838

[22] Filed: Sep. 8, 1981

Related U.S. Application Data

[62] Division of Ser. No. 55,689, Jul. 6, 1979, Pat. No. 4,328,580.

[51] Int. Cl.³ .............................................. G11B 15/46
[52] U.S. Cl. .................................................... 360/73
[58] Field of Search ............................ 360/27, 39, 73

[56] References Cited

U.S. PATENT DOCUMENTS 4,218,713  8/1980  Horak et al. ......................... 360/73

OTHER PUBLICATIONS

IBM Technical Disclosure Bulletin vol. 2 No. 5 Feb. 1960 pp. 86–89 Buffer System, Skov et al.

*Primary Examiner*—George G. Stellar
*Attorney, Agent, or Firm*—M. Reid Russell; Robert R. Mallinckrodt

[57] ABSTRACT

The present invention includes an arrangement for averaging the content of first-in-first-out buffers of each track of a multi-channel digital tape recorder for controlling tape speed to enable a smooth over-dubbing of information recorded at different times on separate tracks.

5 Claims, 2 Drawing Figures

UNIFORM SPEED CONTROL FOR A MULTI-CHANNEL DIGITAL RECORDER

This application is a divsion of application SN. 055,689 filed July 6, 1979 now U.S. Patent No. 4,328,580 issued May 4, 1982 entitled APPARATUS AND AN IMPROVED METHOD FOR PROCESSING OF DIGITAL INFORMATION.

BACKGROUND OF THE INVENTION

1. Field

This invention relates to data analysis schemes for use in a multichannel digital tape recorder.

The present invention involves apparatus for performing digital recording of analog information and is particularly suited to reproduction of audio information. Apparatus and a method for providing a faithful information reproduction was disclosed in an earlier U.S. patent entitled, "Apparatus and Method For Providing Error Recognition and Correction of Recorded Digital Information", invented by one of the present inventors, U.S. Pat. No. 4,202,018 issued May 6, 1980 and the parent of this application U.S. Pat. No. 4,328,580 . The present invention preferably utilizes certain of the circuitry and error detection/correction techniques disclosed in these U.S. patents.

2. Prior Art

As detailed in the above-cited earlier U.S. patents, there are numerous advantages to reproducing audio information in a digital form. The present invention preferably incorporates a full reproduction of primary data on a backup track, and recognizes that such exact reproduction and substitution, where appropriate, of backup for primary data on discovery of an error, is not in itself new. Such is well known in the art and is shown in patents by Dirks, U.S. Pat. No 3,281,804, Hendrichs, et al, U.S. Pat. No. 3,665,430 and Gabor U.S. Pat. No. 3,264,623. The present invention provides for synchronizing of data on separate tracks recorded independently and at different times, whereby time differences are averaged to simplify over-dubbing of one track over another, which arrangement is believed to be unique.

It is a principal object of the present invention to provide appropriate circuitry and a scheme for its use for controlling the speed of travel of a tape whereon two tracks of data are recorded, such that data recorded on different tracks at different times can be synchronized together for providing a smooth over-dubbing and synchronized playback of finished analog signals.

The present invention includes an arrangement for averaging tape speeds between tracks such that information recorded on one track can be synchronized with information on another and over-dubbed thereover. The circuitry arrangement to perform this data matching provides for averaging of tape speed whereby a first-in-first-out buffer circuit for each audio channel is maintained at a certain desired level of fullness as compared or averaged with other channel buffer circuits so as to compensate for the effects of wow and flutter across the tracks.

THE DRAWINGS

In the drawings that illustrate that which is presently regarded as the best mode for carrying out the invention:

FIG. 1, is a block schematic of a single channel of a multi-channel digital tape recorder, that should be understood to receive data, in the form of an analog signal, to process and convert that signal to digital form and to record in duplicate, that information on two tracks, the Figure showing inputs, and circuitry associated with the data conversion, recording, error detection/correction and playback, and first-in-first-out buffer memory circuitry of the present invention; and FIG. 2, a block schematic of first-in-first-out buffer memory circuits of a four channel unit that are connected so as to pass, when filled appropriately, signals to control tape speed whereby tracks recorded on different tapes can be synchronized in over dubbing operations.

DETAILED DESCRIPTION

Figure 1:
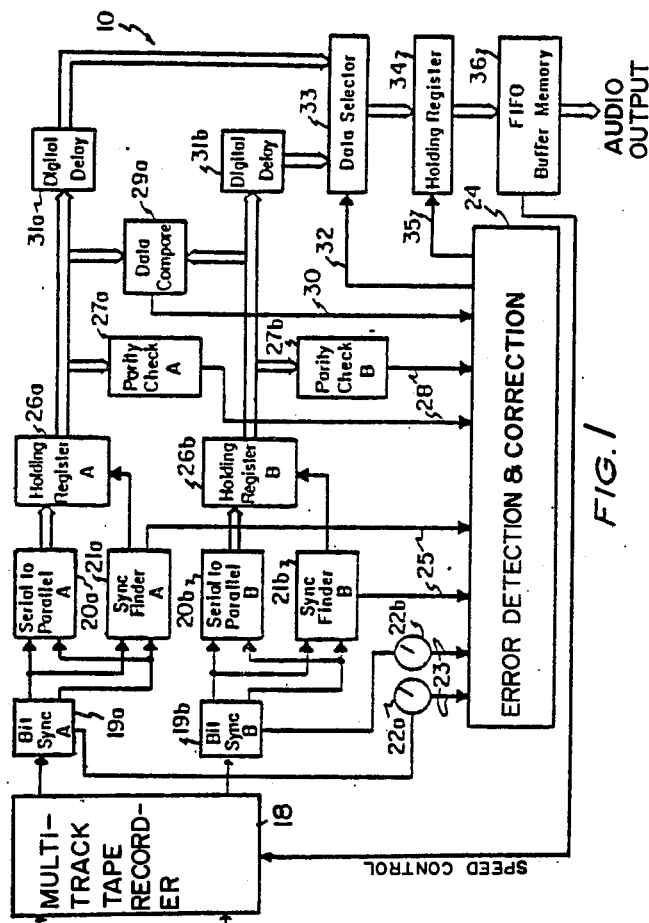

Referring now to the drawing:

In FIG. 1, is shown a block schematic that illustrates a signal flow through a single channel 10 that should be understood to be one channel of a multiple channel digital recorder of the present invention. The single channel 10 shown in FIG. 1 is representative of each channel of such multi-channel digital tape recorder, which digital tape recorder is preferably arranged to involve a non-return to zero (NRZ) recording.

In the schematic of FIG. 1 the blocks shown and identified therein should be understood to be indicative of standard electrical circuits and, as appropriate, are essentially like the circuits shown and described in the U.S. patent entitled "Apparatus and Method for Providing Error Recognition and Correction of Recorded Digital Information", U.S. Pat. No. 4,202,018, cited earlier herein.

The present invention includes a combination of circuitry that together function uniquely, as will be described, and so specific electrical components within a block of circuitry, their connections, and individual operations are standard and, except where appropriate, will not be described in detail herein.

In the single channel 10 schematic of FIG. 1, reading from left to right therein, an audio input is shown passed into a amplifier 11. It should, however, be understood that any analog signal input would be appropriate for processing within and by the present invention. For purposes of this disclosure the signal input will be assumed to be an audio signal as from a musical performance. The amplifier 11 conventionally increases the strength of the received signal and passes it to a low pass filter 12 wherein frequencies above a so-called Niquist Frequency are filtered out. Such signal filtration is to prevent aliasing in the sample and hold and analog to digital conversion circuitry to follow.

From the low pass filter 12 the signal passes to a sample and hold circuit 13 wherein is contained a clock, not shown, that is part of a record control that provides clocking pulses that are imposed upon the input signals and function as timing pulses to control the operation of an analog to digital converter circuit, shown in FIG. 1, hereinafter referred to as an A/D converter 14. In the A/D converter 14, under the control of the clocking pulses, the analog signal is converted to digital form; perferably increments of the analog signal are represented as 16-bit data words, and each date word is fed, at intervals, into a bit stream generator 15 and into a parity generator 16. The bit stream generator 15 rearranges the parallel data words into a serial configuration and synchronization or sync codes are included therewith. A parity bit is inserted therein by parity generator 16 and the bit stream generator 15 duplicates each data word for simultaneous recording on main and backup tracks. The data words with parity and sync codes therein from the bit stream generator, travel through lines 17a and 17b to a conventional multi-track tape recorder 10 that records the serial information, as main and backup track flows, onto a permanent media. The permanent media is preferably magnetic tape of a multi-track tape recorder 18.

So arranged, the main and backup track data flows are recorded on magnetic tape alongside one another and spaced apart such that a data loss on one track, as with a tape defect, or the like, will not necessarily extend to the other track. A loss of data, error, or the like, that occurs on the main track will cause or trigger a switching of the playback to the backup track and, of course, if a problem occurs with the backup track, the main track data will continue to be passed for playback. So arranged, a loss on one track only will not result in an unrecoverable loss of information.

Shown in FIG. 1, serial information is taken from the multi-track tape recorder 18 by bit synchronizers, shown as bit sync A, 19a and bit sync B, 19b, whereat the signal quality of each main and backup track data flow is checked, as indicated by meters 22a and 22b and that information passed through lines 23 for evaluation, in error detection and correction circuitry 24. Meters 22a and 22b should be understood to be symbolic of apparatus for performing signal quality evaluation and should not be understood to limit such signal quality evaluation to tests performed by a meter only.

From the bit sync A and B, 19a and 19b, the main and backup track information A and B is passed to serial to parallel converters 20a and 20b and sync finder circuitry 21a 21b that are also connected together. The serial to parallel converters 20a and 20b, reconvert the data to parallel arrangement for passage to holding registers 26a and 26b and to the sync finders 21a and 21b. The sync finders 21a and 21b look for the presence of proper synchronization codes between data words and information about the presence or absence of the proper synchronization codes is passed to error detection and correction circuitry 24. Sync finder circuitry 21a and 21b in the present invention preferably include synchronization engine circuitry, not shown. At system startup, such synchronization engine circuitry utilizes the sync finder to rapidly locate what appears to be a valid synchronization or sync code and will count from that sync code, a certain number of bits, as say the 20 bits, per word of the present invention, and will then look for another proper sync code. This process is repeated until either a set number (n) of properly located sync codes are found or a sum of the proper sync codes less erroneous sync codes found equals zero whereupon "sync not found" is declared and the sync finder 21a nd 21b is directed to again search to locate a proper sync code.

Sync finders 21a and 21b are also connected to main and backup track holding registers A and B, shown at 26a and 26b, that synchronize the two flows for passage to digital delay circuitry 31a and 31b. Also, the data flows from holding registers 26a and 26b, prior to their reaching the digital delay circuitry, are each evaluated by parity check circuitry 27a and 27b, wherein a check is made that a proper parity bit is present in each data word, and data compare circuitry 29a. Information concerning the presence or absence of a proper parity bit in each data word is passed from parity check circuitry 27a and 27b through lines 28 to error detection and correction circuitry 24. Also, prior to the signals reaching digital delay circuitry 31a and 31b, a comparison of the data on the main and backup tracks or A and B tracks, is made at data compare circuitry 29a, with information about that comparison passed through line 30 to the error detection and correction circuitry 24.

Shown in FIG. 1, main and backup track information is passed through digital delay circuits 31a and 31 b prior to the data reaching the data select circuit 33, in which digital delay circuits a delay is created between when a selection determination is made and when the particular data word actually reaches the data selector circuitry 33. Therefore, by creating a delay before a problem is sensed on one track, a data selection can be made in anticipation of an error before the particular questionable data word actually needs to be acted upon. The digital delay circuitry 31a and 31b and data selector circuitry 33 provide both a holding in of an error and selection of backup track data words before and after an error occurs, providing "look behind 38 and "look ahead" functions to insure a most faithful data reproduction possible. Utilizing this approach, main track data, before a dropout and after one has occurred, is not used. The data selected therefore has a greater likelihood of being correct than was heretofore possible.

Shown in FIG. 1, from the data selector circuitry 33, the selected data word flow passes to a holding register 34 that also receives commands or signals through line 35 from the error detection/correction circit 24. When and if the holding register 34 is informed by the error detection/correction circuit 24 that a fatal dropout has occurred on both main and backup tracks, and therefore neither main or backup track data is usable, it will hold and pass the last good data word until notified that correct data is available.

From the holding register 34, the sigal is passed to a FIFO, or first-in-first-out, buffer memory 36 that is connected, not shown, to the tape drive for controlling speed thereof. So arranged, as will be explained in detail later herein, the FIFO buffer memory 36 controls the tape speed to maintain a certain percentage fullness. In the invention, that fullness is compared with buffer memory fullness of the other channels, not shown, for synchronizing recording of information recorded on the tape so that it may be played back in synchronization. The preferred arrangement of the buffer memory 36 in conjunction with other buffer memories of the other tracks for providing tape speed control will be discussed in detail below with respect to FIG. 2.

Figure 2:
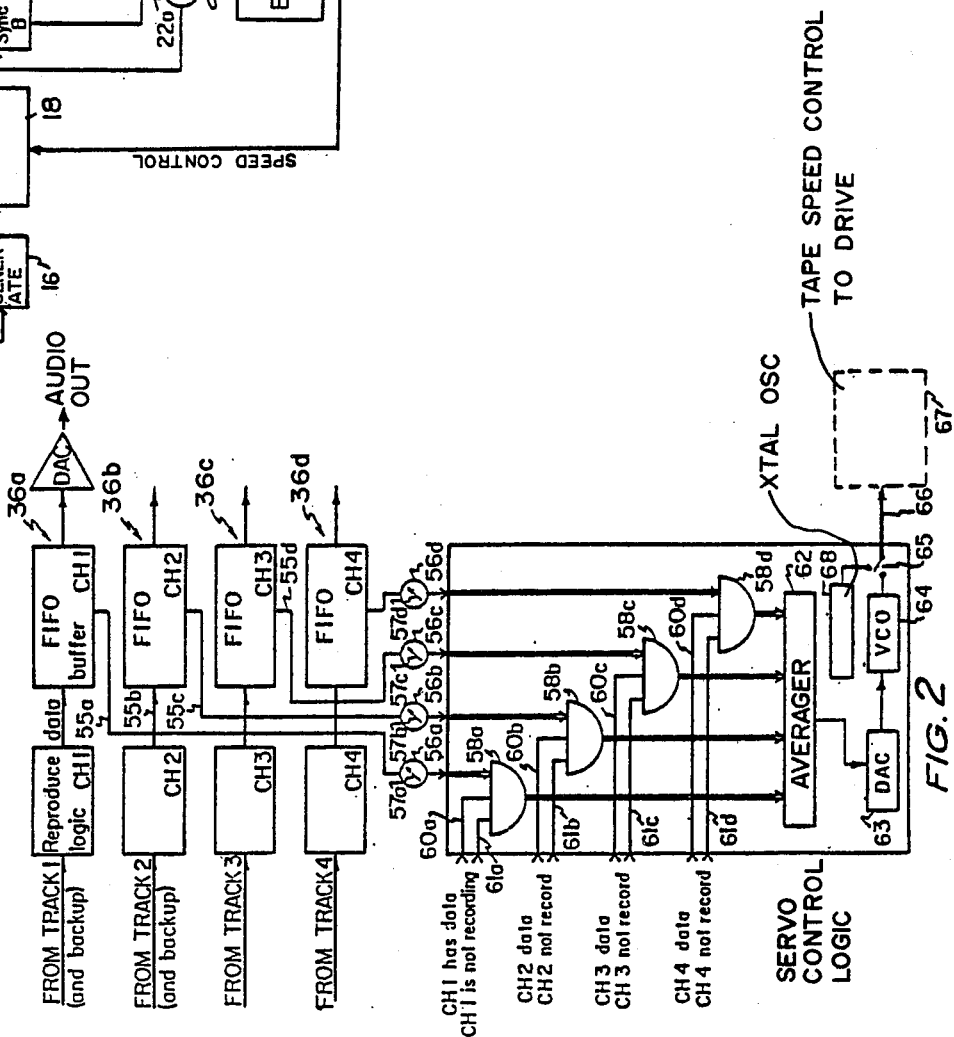

As discussed, a preferred multi-channel digital tape recorder of the present invention includes a first-in-first-out buffer memory 35 for each channel. In FIG. 2 is shown, in schematic, for a 4-channel digital tape recorder first-in-first-out, or FIFO, buffer memories 36a, 36b, 36c, and 36d for each channel. The FIFO buffer memories 36a through 36d should be taken as being identical to one another, each individually performing the functions described herein for buffer memroy 36. Further, it should be understood that the blocks immediately preceding the FIFO buffer memories 36a through 36d represent the logic for each main and backup track for each channel of a four-channel recorder. Each FIFO buffer memory 36a through 36d is shown in FIG. 2 connected through lines 55a through 55d, respectively, to what are represented as to be meters 56a, 56b, 56c, and 56d. Meters 56a through 56d illustrate that FIFO buffer memory fullness preferably registers or is measured as a digital number. Each FIFO buffer memory is preferably maintained approximately half full and, at that desire half-full level, arrows 57a, 57b, 57c, and 57d of meters 56a through 56d would be at approximately a same mid-point on the scale. The present invention, illustrated by arrows 57a through 57d, provides for an averaging of the fullness levels of the buffer memories when a channel has data and is not recording so as to increase or decrease tape speed to provide an average half-full level. Thereby, a uniform tape speed is obtained such that playback of the tracks of the different channels can be synchronized, as say for the over-dubbing of one track over another, or like operations. To provide such fullness averaging, the digital number form each meter 56a through 56d is passed to appropriate logic circuitry identified as 58a, 58b, 58c, and 58d that are essentially gates that also receive, along with the buffer memory fullness values, signals representing channel recording status and indicating whether or not the channel is recording. The channel status signals are shown by arrows 60a through 60d that indicate if a particular channel has data thereon. Wheher or not the channel is recording is represented by lines 61a through 61d. Assuming the presence of data and that the channel is not in a record mode, the gates 58a through 58d will pass the fullness values as digitaL numbers of the buffer memory 35a through 35d to an averager 62. If the channel is recording, the gate will not pass that digital number. The averager 62 provides thereby an average digital number that represents buffer memory fullness for those channels not in a recorded mode that have data thereon, which average digital number is then converted to a corresponding voltage in a digit-to-analog converter (DAC) circuit 63, connected thereto. The voltage from the DAC circuit 63 is then passed to a variable frequency oscillator labeled VCO 64 that controls tape speed and passes an appropriate signal through a switch 65 and through a line 66 to a tape control drive box 67, shown as a broken line box, that appropriately controls tape speed. Should all channels be in a record mode, then no signal is passed to the averager 62, which condition would cause switch 65 to move to a position where a median tape speed is commanded by an external oscillator 68 that is otherwise separate from the circuit.

As per the above, tape speed is controlled by an average buffer memory fullness of tracks with data thereon that are not in a record mode, preventing buffer memories in a record mode from being considered in the averaging. New material being recorded on an active channel will not affect the speed of that recording. Rather, the speed of recording of that new material is controlled by data already recorded on another channel. Thereby, a synchronizing or bringing into synchronization of data already recorded with material being recorded is accomplished. So arranged, materials recorded at different times can be brought into synchronization for over-dubbing operations, or the like.

Summarizing, the present invention provides circuitry for averaging buffer memory fullness for a plurality of channels to consider only those channels not recording, with data thereon, whereby existing data controls the recording speed of new material, providing for a smooth over-dubbing of information being recorded with information recorded earlier. Also, while a four-channel recorder has been shown to be preferred, it should be understood not to be limited to recorders of any particular number of channels.

While a preferred embodiment of our invention and method has been shown and described herein, it should be obvious that this disclosure is made by way of example only and that variations are possible without departing from subject matter coming within the scope of the following claims, which claims we regard as our invention.

We claim:

1. In a multi-channel digital recorder that includes memory for each track of each channel a method for synchronizing playback of information recorded on different tracks on a tape media including the steps of,
   measuring memory fullness of each track;
   averaging memory fullness of tracks not recorded to provide an average fullness measurement; and
   utilize that average fullness measurement to control tape speed.

2. A method as recited in claim 1, further including converting the memory fullness of each track to a voltage producing a single voltage as the average of memory fullness measurement; and
   controlling, with that single voltage, the output of an oscillator that controls tape speed.

3. A method as recited in claim 1, further including, moving the tape at a medium speed when all tracks are recording.

4. Apparatus for providing uniform tape speed control for a multi-channel digital tape recorder comprising,
   logic circuitry for each channel for conversion of an analog signal to digital form and recording that digital data on a tape media and includes tape speed control circuitry and circuitry for retrieving that recorded data to pass most likely correct information for playback;
   first-in-first-out buffer memory means connected to receive the information flow passed from said digital tape recorder;
   means for measuring the fullness of said buffer memory means and passing that information to gate means;
   gate means connected to receive the measurement of said fullness of said buffer memory means of each channel and to receive channel status information as to the conditions that data is present and that information is not being recorded, to pass said fullness measurement when both said channel status conditions are present;
   averaging means connected to receive said measurements of said buffer memory means fullness from said gate means for providing an average buffer memory means fullness; and
   oscillator means connected to receive said averaged buffer memory means fullness whose output frequency reflects said averaged buffer memory means fullness and is connected to control operation of said tape speed control circuitry.

5. Apparatus for providing uniform tape speed control as recited in claim 4, further including
   switch means arranged with said oscillator means whereby if no indicator of buffer memory means fullness is present, said switch means will pass a voltage to operate the tape speed control circuitry at a medium speed.

* * * * *